Feb. 9, 1960 L. J. BOBB ET AL 2,924,461

VIBRATION DAMPING MEANS

Filed June 26, 1957

INVENTORS
LLOYD J. BOBB
HENRY E. JOHNSTON
ORLANDO TARABORRELLI

BY Carl H. Synnestvedt

AGENT

United States Patent Office 2,924,461
Patented Feb. 9, 1960

2,924,461

VIBRATION DAMPING MEANS

Lloyd J. Bobb, Glenside, and Henry E. Johnston and Orlando Taraborrelli, Philadelphia, Pa., assignors to Philco Corporation, Philadelphia, Pa., a corporation of Pennsylvania Application June 26, 1957, Serial No. 668,135

3 Claims. (Cl. 274—23)

This invention relates generally to electroacoustic transducing equipment, and more particularly to improvements in low frequency, vibration damping means associated therewith.

The invention hereinafter described, while having broader applicability, has particular utility when used in suppressing tone arm swinging resonance, a condition initiated by vibratory excitation of the tone arm by the pick-up stylus as it tracks the modulated grooves of a phonograph record. This condition, which is peculiarly manifest at low frequencies, results in distortion of the audio response and often attains sufficient amplitude to result in mistracking of the phonograph needle.

Tone arm resonance results in excessive excursions of the tone arm relative to the pick-up stylus, and superimposes on the normal vibratory pattern of the stylus, a vagrant oscillatory profile, the composite of these effects resulting in the generation of voltages bearing little relation to the desired level of response normally resulting from excitation of the stylus.

One solution to this problem is to make the pick-up sufficiently compliant to be incapable of coupling energy to the tone arm, this approach, however, has certain intrinsic limitations in that the inherently high threshold value of force required to activate the pick-up is well within the minimal force requirements necessary to induce vibratory excitation of the tone arm.

Another approach to this problem is the well known technique of adding mass to the tone arm to thereby depress its resonant frequency to a point below the perceptible audio range. Unfortunately, however, this approach, notwithstanding counterbalancing, often results in a dynamically unstable system.

It is an object of this invention to provide vibration damping apparatus adapted for mounting on a phonograph tone arm and permitting the practical and advantageous use of "lossy" damping materials in spite of their tendency to cold-flow.

It is a further object of this invention to provide means for suppressing tone arm swinging resonance in a more efficient manner and one which eliminates the undesirable side effects of prior art devices.

A still further object of this invention is to provide a unique vibration damping device for use with phonograph tone arms which is both simple and inexpensive, and readily fabricated by, and adapted to, mass production techniques.

The above mentioned and other objects within contemplation will be more readily understood by reference to the accompanying detailed description and drawing in which.

Figure 4:
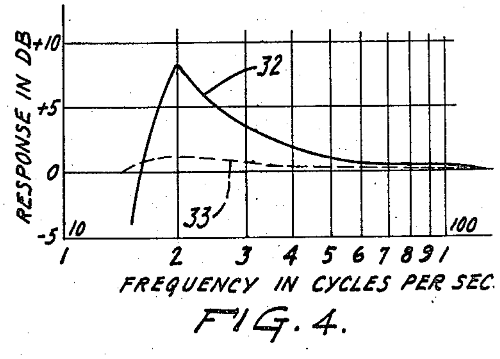
Figure 5:
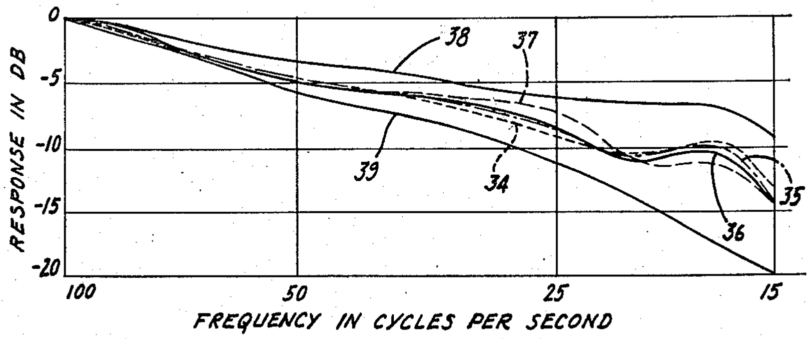

Figure 4 is a diagram illustrating the improvement in the frequency-response characteristic of a conventional pick-up resulting from use of the present invention; and Figure 5 is a diagram illustrative of the control effected, using the vibration damping technique here taught, over the frequency-response characteristic of a conventional phonograph, throughout the normal range of operating temperatures.

Basically this invention consists of securing a member capable of high energy dissipation to the part subject to vibration and then anchoring or stalling an unattached end portion thereof against movement to permit dissipation, through flexure of the member, of the vibrationally induced energy. The use of coupling materials exhibiting cold-flow characteristics, where necessary or desirable, are made possible by the unique structural arrangement illustrated and hereinafter described.

Figure 1:
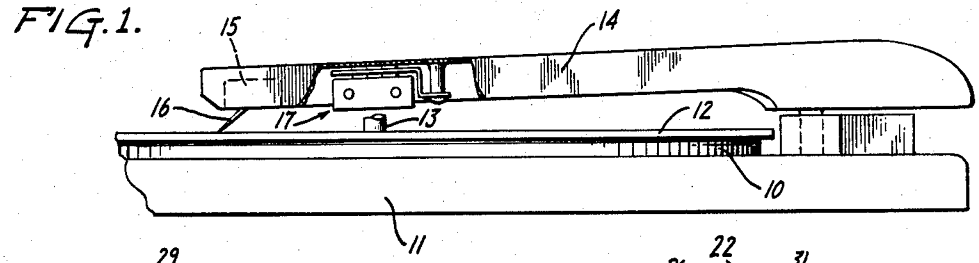
Figure 1 is a fragmentary side elevational view illustrating those portions of a conventional phonograph system essential to an adequate showing of this invention.

Now making more detailed reference to the drawing, and in particular to Figure 1 thereof, there is shown a portion of a conventional phonograph including a turntable 10 rotatably journaled within the panel structure 11 and adapted to hold records 12 during the playing thereof. A centering spindle 13 serves to orient the records and to retain them on the turntable. The tone arm 14, which includes a pick-up 15 provided with a stylus 16 adapted for excitation by the modulated grooves of a phonograph record, is arranged on the mounting panel to swing horizontally and to pivot vertically with respect to the turntable 10 in a manner permitting the stylus 16 to be brought into engagement with a record placed in playing position on the turntable.

While variations in physical parameters and structural details are necessary to adapt the vibration damping device herein disclosed to particularly applications, it will be recognized that the means permitting optimum utilization of this device are delineated by the embodiment chosen for illustration, specific values of mass and compliance, to meet particular operating conditions, being most advantageously determined by empirical means. However, specific values and dimensions of the parts constituting a preferred embodiment of this invention are given where their specifications would provide a better understanding of the invention and facilitate its adaptation to alternative applications.

Figure 2:
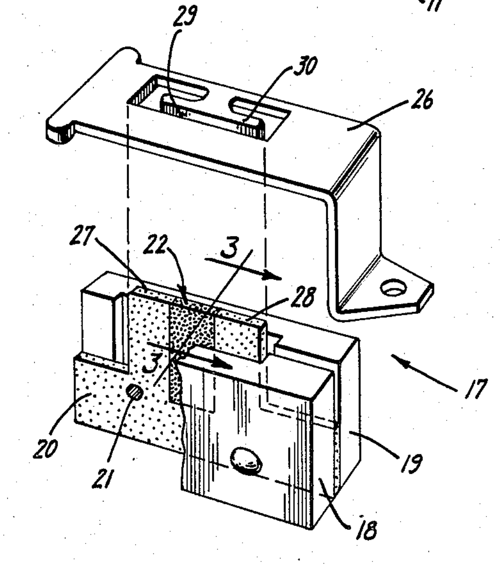
Figure 2 is an exploded view in perspective, depicting the unique structural arrangement of a preferred embodiment of this novel vibration damping apparatus.

In accordance with the invention and with the foregoing qualifications in mind, an embodiment found to be particularly effective in suppressing tone arm resonance of the type described, is that shown in Figure 2. The damping device, referenced generally as 17, comprises two lead blocks 18 and 19 having an aggregate weight of 31 grams, the blocks being secured to the resilient member 20, as by rivets 21. Effective tone arm damping was obtained utilizing a rectangular slab of cellulose nitrate plastic 22, commercially known as Viscoloid, a damping material having a tendency to cold-flow. To effectively utilize this material, from a practical standpoint, it was necessary to minimize conditions that would tend to aggravate or accelerate its deleterious cold-flow property. The principal requisites to its stable use, from a structural and operational aspect, are that it be freed of tensional loading, and as far as practicable, dimensionally confined, thereby to prevent or mitigate variation in its physical properties produced by change in its structural configuration.

Figure 3:
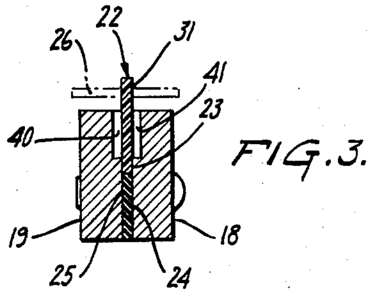
Figure 3 is a sectional view taken along the line 3—3 of Figure 2.

One manner of accomplishing sufficient dimensional constraint of the cold flowing material, while still permitting advantageous utilization of its highly desirable flexural characteristics, is the arrangement shown in Figure 2, the slab of cold flowing material 22 being peripherally flanked on three sides by the resilient support member 20, and its lower terminal portion 23, as shown in Figure 3 being additionally slidably confined by the abutting surfaces 24 and 25 of the lead blocks 18 and 19.

The assembly, comprising the member 20 and lead blocks 18 and 19, is then suspended from the bracket 26 by the upwardly extending tab portions 27 and 28 of the elastic suspension member 20, the tabs being located within the bracket cavity 29 and securely confined therein by the closure member 30. The upper portion 31 of the Viscoloid slab 22 is similarly secured to the bracket 26. The lower terminal portion 23, however, as shown most clearly in Figure 3, is merely slidably confined between the confronting surfaces of the lead blocks 18 and 19, thereby preventing tensional loading of the damping element 22 while at the same time permitting its flexure by the vibrating tone arm 14. The element 22 is approximately 1/16 of an inch thick, 29/64 inch in length and about 13/64 inch wide and mounted so as to permit the element to have a mean free swinging length of about 1/4 inch; this latter length being defined as the distance from the point of pivotation of the element 22, from the bracket 26, to its point of frictional contact with the confronting lead blocks 18 and 19. This constructional arrangement is significant in that it permits advantageous use of the bending compliance characteristic of Viscoloid while preventing, from a practical standpoint, "cold flow" of the material, thereby insuring the structural and operational stability of the overall system, making its use commercially feasible.

The assembly as above constituted is then mounted on the tone arm as shown in Figure 1. This tone arm is a zinc, die cast member weighing approximately 120 grams, and having a projected length, as measured between pivot and stylus, of about 8½ inches. The center of gravity of the vibration damping system is conveniently located approximately 21/16 inches from the stylus. It is recognized, however, that still further reduction in the mass of the damping system may be effected by disposing the system in still closer proximity to the stylus.

Another particularly troublesome problem attending the use of Viscoloid, or material having similar properties, in applications of this nature, is the variation in compliance accompanying change in temperature. To insure adequate damping throughout the range of temperatures normally obtaining during phonograph operation consequently requires a technique for effectively countering this fluctuation in compliance. An effective technique in accordance with this invention is to use a material for the suspension means 27, 28 which, when acting in conjunction with the damping element 22, will offset any deviation from the accepted norm. A combination which was found to exhibit the desired characteristics, and which was effective to suppress tone arm resonance throughout the prescribed temperature range, included material known as Pierce Roberts compound No. 1173 having a Bashore Resilio meter reading of 11 maximum for the suspension means 27 and 28, and Viscoloid as the damping element 22, the precise apportionment of materials being a matter of empirical determination. In this particular embodiment, the two upstanding tab portions 27 and 28 are each 3/16 of an inch wide and 1/16 of an inch thick.

The suppression of tone arm resonance effected, utilizing the structural arrangement and combination of materials shown and described, is dramatically reflected by the graph shown in Figure 4. The curve 32 depicts the low frequency audio output obtained from a system employing an undamped, conventional tone arm. It will be noted that for frequencies below 100 CPS the response increases rapidly with decreasing frequency. This condition, as mentioned previously, not only produces distortion, but is also likely to cause mistracking, when operating under low needle pressure. It should be further noted that for frequencies below 20 CPS there is an acute attenuation in the audio response, a condition brought about by the synchronous motion of stylus and tone arm.

Curve 33 of Figure 4 shows the output response of the same phonograph when the tone arm is compliantly coupled to the vibration absorbing device constituting the preferred embodiment of this invention. The energy absorbed by this device, as clearly shown by the curve, substantially suppresses audio distortion resulting from tone arm resonance.

Damping is effected by simply attaching one end of a body of compliant lossy material to the tone arm while preventing movement of depending unattached end portions of said body by a vibrationally isolated weight suspended from the tone arm. This arrangement permits flexure of the compliant material by the tone arm during periods of resonance. The lower end of the compliant body is fixed or "stalled" against movement by the inertial drag of the suspended weight. Flexure of this body dissipates the vibratory energy suppressing tone arm swinging resonance.

The advantages accruing through the use of this vibration damping device, to mention a few, are that by producing substantially linear response in this low frequency range of the audio spectrum the applicability of a simple equalizer circuit to compensate for the normally low frequency response characteristic of conventional phonographs, is insured.

Moreover, the substantial elimination of tone arm resonance prevents mistracking, thereby permitting the use of lower needle pressure with consequent prolongation of the life of both record and stylus.

Additionally, damping the swinging resonance peak reduces the possibility of overloading the amplifier at sub audio frequencies. These frequencies, which are ever present as a result of turntable vibration, drive the loud speaker and amplifier beyond their linear capabilities producing intermodulation in the useful band.

Moreover, the use of the vibration damping system discussed supra insures the continued suppression of undesirable vibrations throughout the normal range of operating temperatures, this being graphically illustrated in Figure 5, by the curves 34 through 37, which, respectively depict the audio response of still another phonograph system, damped in accordance with this invention; at 55° F., 75° F., 90° F., and 110° F., the acceptable range of deviation from accepted standards, as imposed by specified amplifying equipment, being delineated by the bounding lines 38 and 39. As will be readily observed, even on the exaggerated scale employed, use of the technique here taught can be utilized to insure stable performance throughout the prescribed range of operation.

This marked attenuation in audio distortion, evidenced by the two sets of curves shown in Figures 4 and 5, is even the more remarkable when it is realized that the device for accomplishing this much sought for result is quite simple and inexpensive to construct and readily adaptable to systems of varying design.

In order to facilitate the use of the vibration damping device shown in situations where space is a major consideration, as in the illustrated embodiment, the structural innovation, shown most clearly in Figure 3, has been employed. This arrangement permits the optimum utilization of available space by allowing the mass of the system, here taking the form of lead blocks 18 and 19, to be positioned in as close proximity to the support bracket 26 as is operationally permissable, taking into consideration the transverse arc of motion through which the system travels when under vibratory excitation. By the simple expedient of providing the lead blocks, 18 and 19, with the confronting channel portions 40 and 41, the mass may be positioned as close to its support means as operational parameters permit while still permitting the necessary flexural freedom of the coupling means.

While a preferred embodiment illustrative of the present invention has been depicted and described, modifications may be made therein without departing from the spirit and scope of the present invention. It will be understood, therefore, that such changes and modifications are contemplated as come within the scope of the appended claims.

We claim:

1. In sound reproducing equipment employing a tone arm carrying a transducing element adapted for vibratile excitation by the laterally modulated grooves of a phonograph record, apparatus for damping tone arm swinging resonance, comprising: a body of predetermined mass suspended from and substantially non-vibrationally coupled to said arm; and a body of compliant material having high internal resistance to deformation secured to said arm and having a depending end portion anchored by said body against vibratory movement, the arrangement permitting flexure of said compliant body by the vibrating arm thereby to dissipate vibratory energy and suppress tone arm resonance.

2. In sound reproducing equipment having a tone arm carrying a transducing element adapted for vibratory excitation by the laterally modulated grooves of a phonograph record, apparatus for damping tone arm swinging resonance comprising: a body of predetermined mass suspended from said arm and substantially vibrationally isolated therefrom; and compliant means having high internal resistance to deformation secured to said arm for movement therewith and having a depending end portion anchored by said body against lateral movement relative to said arm.

3. In sound reproducing equipment having a tone arm carrying a transducing element adapted for vibratory excitation by the laterally modulated grooves of a phonograph record, apparatus for damping tone arm swinging resonance comprising: a body of predetermined mass carried by and vibrationally isolated from said arm; and compliant cold-flowable means having high internal resistance to deformation, secured to said arm for movement therewith and having a depending end portion anchored by said body against lateral movement relative to said arm.

References Cited in the file of this patent

UNITED STATES PATENTS

| | | |
|---|---|---|
| 1,905,175 | Kendall | Apr. 25, 1933 |
| 2,177,692 | Di Toro | Oct. 31, 1939 |
| 2,246,296 | Di Toro | June 17, 1941 |
| 2,329,526 | Germeshausen | Sept. 14, 1943 |
| 2,803,713 | Miller | Aug. 20, 1957 |

FOREIGN PATENTS

| | | |
|---|---|---|
| 659,644 | Great Britain | Oct. 24, 1951 |